(12) United States Patent
Pollock et al.

(10) Patent No.: US 6,269,958 B1
(45) Date of Patent: Aug. 7, 2001

(54) WALL-MOUNTED STORAGE DEVICE

(75) Inventors: Daniel A. Pollock, Perrysburg; Louis M. Soltis, Rossford, both of OH (US); Alexander O. Bally, Pittsburgh, PA (US); Ronald J. Sears, Worthington, OH (US); Roland Zeder, Pittsburgh, PA (US)

(73) Assignee: Gear Up Technologies Corporation, Perrysburg, OH (US)

( * ) Notice: Subject to any disclaimer, the term of this patent is extended or adjusted under 35 U.S.C. 154(b) by 0 days.

(21) Appl. No.: 09/567,335

(22) Filed: May 9, 2000

Related U.S. Application Data

(62) Division of application No. 08/923,808, filed on Sep. 4, 1997, now Pat. No. 6,082,552.

(51) Int. Cl.[7] ........................................ A47F 7/00
(52) U.S. Cl. .................. 211/18; 211/104; 248/292.13; 248/284.1
(58) Field of Search ........................ 211/18, 100, 104, 211/17; 248/284.1, 292.13

(56) References Cited

U.S. PATENT DOCUMENTS

| | | |
|---|---|---|
| 557,567 | 4/1896 | Eddy . |
| 580,032 | 4/1897 | Bierbach . |
| 610,656 | 9/1898 | Martin . |
| 618,394 | 1/1899 | Clark . |
| 618,999 | 2/1899 | Sayer . |
| 621,819 | 3/1899 | Ivatt . |
| 624,231 | 5/1899 | Martin . |
| 633,806 | 9/1899 | Cifka . |
| 1,232,501 | 7/1917 | Colen . |
| 2,875,903 | * 3/1959 | Shourds ........................ 211/100 |
| 3,782,559 | 1/1974 | Wright . |
| 3,872,972 | 3/1975 | Cummins et al. . |

(List continued on next page.)

FOREIGN PATENT DOCUMENTS

| | | |
|---|---|---|
| 4209007 | 8/1993 | (DE) . |
| 2045707 | 11/1980 | (GB) . |
| WO 91/05693 | 5/1991 | (WO) . |

*Primary Examiner*—Daniel P. Stodola
*Assistant Examiner*—Khoa Tran
(74) *Attorney, Agent, or Firm*—MacMillan, Sobanski & Todd, LLC

(57) ABSTRACT

A wall-mounted storage device for lifting and storing an object includes a stand adapted for mounting the device on the wall. An arm is pivotally connected to the stand and has an attachment for the object. An anchor member is also pivotally connected to the stand. A damper is connected between the anchor member and the stand. The damper is adapted to extend when pulled upward by the pivoting anchor member. A lockable spring is connected between the anchor member and the arm. The device includes a trigger mechanism adapted to unlock the spring when the object is attached to the arm. When the spring is unlocked, the spring is adapted to extend to push the arm upward. When the spring is locked, the pivoting anchor member and the extendible damper cooperate to enable the arm to be manually lifted. The damper provides a controlled descent when the arm is lowered.

17 Claims, 9 Drawing Sheets

U.S. PATENT DOCUMENTS

| | | |
|---|---|---|
| 3,883,002 | 5/1975 | Moore . |
| 3,924,751 | 12/1975 | Ballenger . |
| 3,934,436 | 1/1976 | Candlin et al. . |
| 3,976,200 * | 8/1976 | Munns ................................... 211/18 |
| 4,114,764 * | 9/1978 | Rich ..................................... 211/100 |
| 4,116,341 | 9/1978 | Hebda . |
| 4,221,353 | 9/1980 | Kuhn et al. . |
| 4,343,404 | 8/1982 | Folsom . |
| 4,700,845 | 10/1987 | Fretter . |
| 4,749,089 | 6/1988 | Stewart, III . |
| 4,813,550 | 3/1989 | Saeks . |
| 4,852,842 | 8/1989 | O'Neill . |
| 5,083,729 | 1/1992 | Saeks et al. . |
| 5,086,930 | 2/1992 | Saeks . |
| 5,125,517 | 6/1992 | Martinell . |
| 5,183,162 | 2/1993 | Ritzenthaler . |
| 5,257,767 | 11/1993 | McConnell . |
| 5,294,006 | 3/1994 | Deschino . |
| 5,433,376 | 7/1995 | Kueshner . |
| 5,474,189 | 12/1995 | Peterson . |
| 5,553,718 | 9/1996 | Robar . |
| 5,642,820 | 7/1997 | Angeles . |
| 5,662,256 | 9/1997 | Bryan . |
| 6,082,552 * | 7/2000 | Pollock et al. ......................... 211/18 |
| 6,105,795 * | 8/2000 | Terragni ............................... 211/100 |

\* cited by examiner

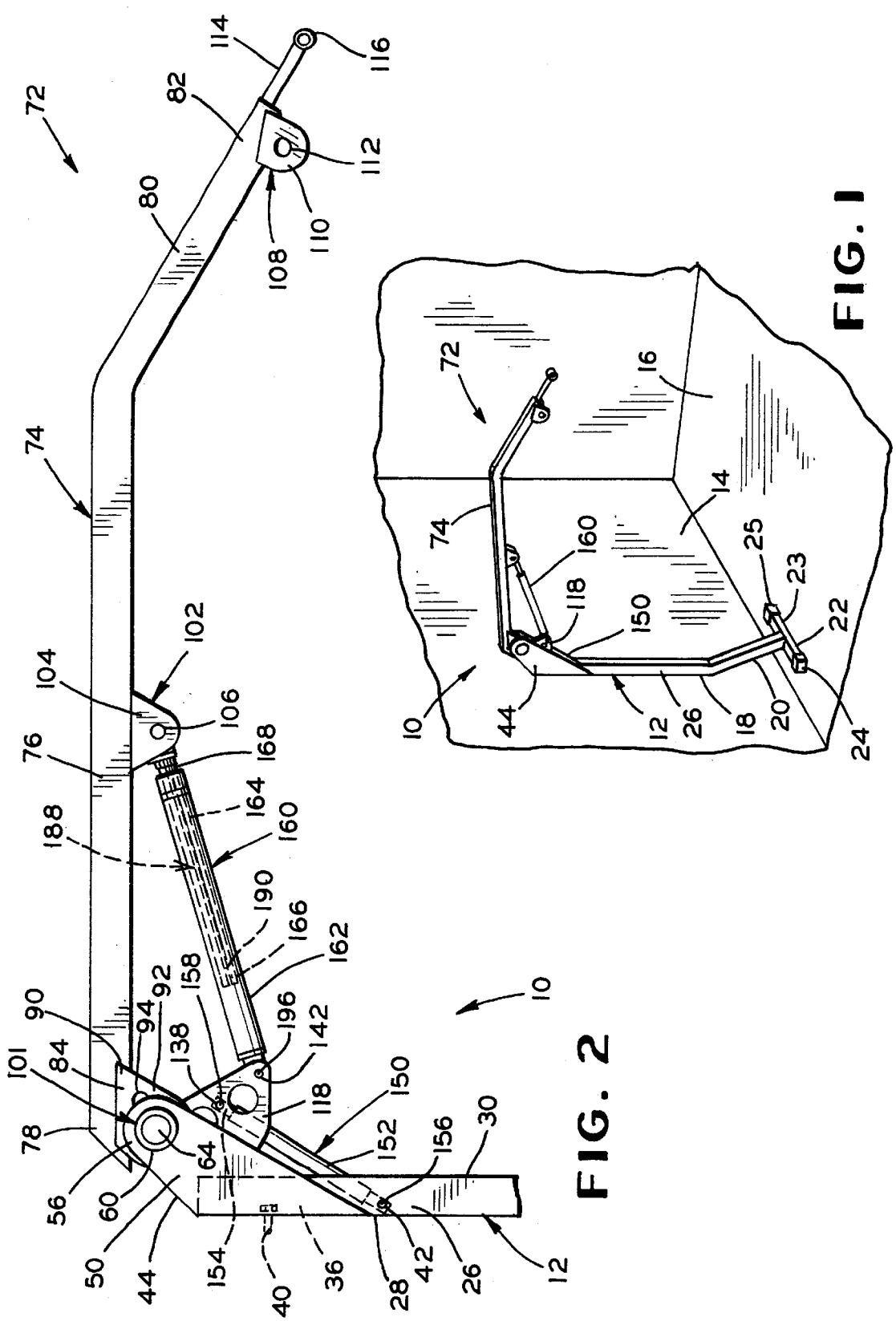

WALL-MOUNTED STORAGE DEVICE

CROSS REFERENCE TO RELATED APPLICATION

This application is a division of Ser. No. 08/923,808, filed Sep. 4, 1997, now U.S. Pat. No. 6,082,552, issued Jul. 4, 2000.

BACKGROUND OF THE INVENTION

This invention relates in general to storage apparatus, and in particular to a wall-mounted storage device for lifting and storing an object such as a bicycle.

Bicycles and other objects are often stored in confined areas, such as garages or patios. The available storage space in these areas is usually limited. Consequently, it may be difficult to find enough space for storing the objects. Another problem is that storing additional objects in the area may interfere with the use of objects currently located in the area. For example, storing a bicycle near a workbench may interfere with the use of the workbench. Unused space is often available on the upper portions of walls in the area. However, gaining access to this unused space for storage can be difficult.

A person can sometimes store an object on the upper portion of a wall by lifting the object and mounting it on the wall. However, lifting a relatively heavy object to an elevated storage position can cause stress and strain on the human body. Children and others may not have the strength to lift the object. Handicapped people may be unable to lift a relatively heavy object to an elevated position. Some people are not tall enough to reach the elevated position. The use of a ladder to reach the elevated position presents safety issues, because it is awkward to lift a relatively heavy object while positioned on the ladder. It is also difficult for a person to hold the object in the elevated position while simultaneously mounting the object on the wall.

In addition to the problems encountered in lifting the object to the elevated storage position, it is also difficult to control the object while it is being lifted and lowered. For example, the front wheel of a bicycle will often move back and forth uncontrollably when the bicycle is being lifted or lowered. This may damage the bicycle or harm the person lifting the bicycle. As another example, a basket of objects being lifted for storage will often move about uncontrollably, The objects may be dropped from the basket, or the basket may be damaged.

Some devices, such as a block and tackle, are known for lifting objects. Unfortunately, currently available devices are not totally satisfactory for lifting an object such as a bicycle to an elevated storage position. The current devices suffer from drawbacks in the areas of ease of installation and use, controllability, reliability, cost or other areas. Some devices require an external power source. There is no widely accepted alternative to human-powered lifting available in the marketplace today. Thus, it would be desirable to provide a wall-mounted storage device capable of lifting and storing an object such as a bicycle in a controlled fashion with minimum effort.

SUMMARY OF THE INVENTION

This invention relates to a wall-mounted storage device for lifting and storing an object. The device includes a stand for mounting the device on the wall and supporting it on the floor. An arm is pivotally connected to the stand and has an attachment for the object. An anchor member is also pivotally connected to the stand. A damper is connected between the anchor member and the stand. The damper is adapted to extend when pulled upward by the pivoting anchor member. A lockable spring is connected between the anchor member and the arm. The device includes a trigger mechanism to unlock the spring when the object is attached to the arm. When the spring is unlocked, the spring extends to push the arm upward. The arm pivots in an arc which provides a clearance of the lifted object over another object such as a workbench. When the spring is locked, the pivoting anchor member and the extendible damper cooperate to enable the arm to be manually lifted. The damper provides a controlled descent when the arm is lowered. Multiple storage devices can be linked together to lift and store a large object such as a ladder.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a perspective view of a wall-mounted storage device in accordance with this invention.

FIG. 2 is an enlarged side elevational view of an upper portion of the storage device illustrated in FIG. 1.

DETAILED DESCRIPTION OF THE PREFERRED EMBODIMENT

Figure 3:
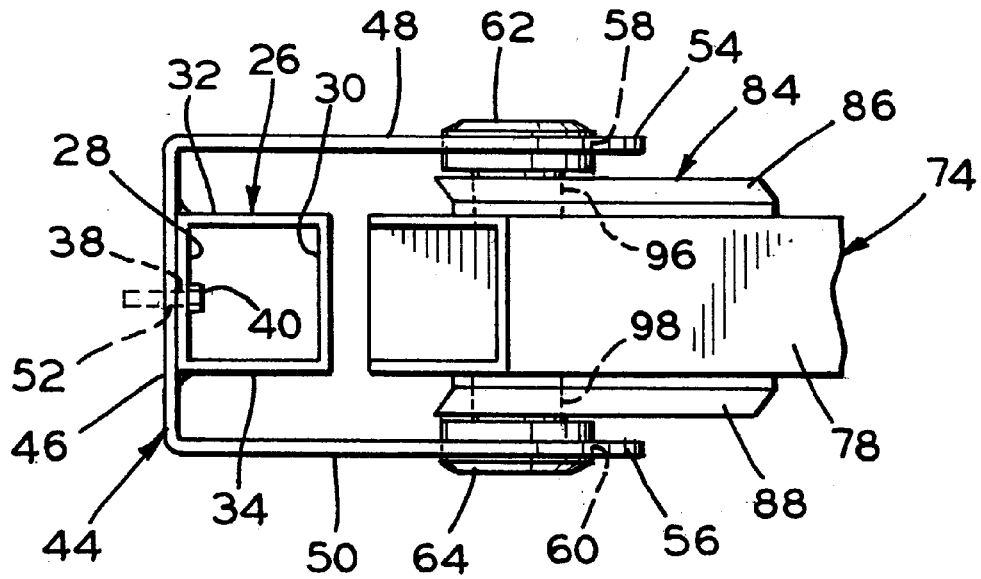
FIG. 3 is a top plan view of a joint between a stand and an arm assembly of the storage device illustrated in FIG. 2.

Referring now to the drawings, there is illustrated in FIGS. 1 and 2 a wall-mounted storage device 10 in accordance with the invention. The storage device 10 is capable of lifting and storing an object, such as a bicycle. The storage device 10 includes a stand 12 for mounting the storage device 10 on a wall 14 and supporting it on a floor 16. The stand 12 includes a base 18, which is preferably a tube having a generally rectangular cross section. Preferably, the base 18 is formed from a metallic material, such as steel. The base 18 includes a generally T-shaped lower portion 20 which is angled outwardly from the wall 14, preferably at an angle between about 35° and about 45°. The lower portion 20 of the base 18 includes a pair of horizontally extending legs 22 and 23 which are adapted to engage the floor 16. Preferably, the ends 24 and 25 of the legs 22 and 23 are covered with a material having a relatively high coefficient of friction, such as rubber, to firmly support the stand 12 on the floor 16.

The base 18 also includes a generally linear upper portion 26 which is disposed adjacent to the wall 14. As illustrated in FIGS. 2 and 3, the upper portion 26 of the base 18 includes an inner surface 28 facing the wall 14, an outer surface 30 facing away from the wall 14, and a pair of side surfaces 32, 34 extending therebetween. The upper portion 26 of the base 18 has an upper end 36. An aperture 38 is formed through the inner surface 28 of the upper end 36, and a fastener (such as a bolt 40) is inserted through the aperture 38 into the wall 14 to secure the stand 12 to the wall 14. The stand 12 is designed to transfer most of the weight of the lifted object directly to the floor 16. As a result, the stand 12 can be conveniently secured to the wall 14 by a single fastener 40. An opening (not shown) is formed through the outer surface 30 of the upper end 36 to provide access for insertion of the bolt 40. A vertical slot (not shown) is also formed through the outer surface 30, below the opening, for a purpose which will be described below. A pair of aligned apertures 42 (one of which is shown) are formed through the side surfaces 32, 34 of the upper end 36, for a purpose which will be described below.

The stand 12 also includes a bracket 44 which is attached to the upper end 36 of the base 18. Preferably, the bracket 44 is formed from a sheet metal such as sheet steel. The sheet metal is cut into the desired shape and then bent into the desired configuration. The bracket 44 is attached to the base 18 of the stand 12 by any suitable method, such as welding. As illustrated in FIGS. 2 and 3, the bracket 44 has a U-shaped cross section, including a shoulder 46 and a pair of spaced apart arms 48, 50. The shoulder 46 is disposed adjacent to the wall 14. The shoulder 46 has an aperture 52 formed therethrough which is aligned with the aperture 38 through the base 18. The bolt 40 extends through the aperture 52 to secure the bracket 44 to the wall 14. The arms 48, 50 of the bracket 44 extend outward and upward from the shoulder 46, generally parallel with one another. The arms 48, 50 have rounded outer ends 54, 56. A pair of aligned openings 58, 60 are formed through the outer ends 54, 56 of the arms 48, 50.

Figure 4:
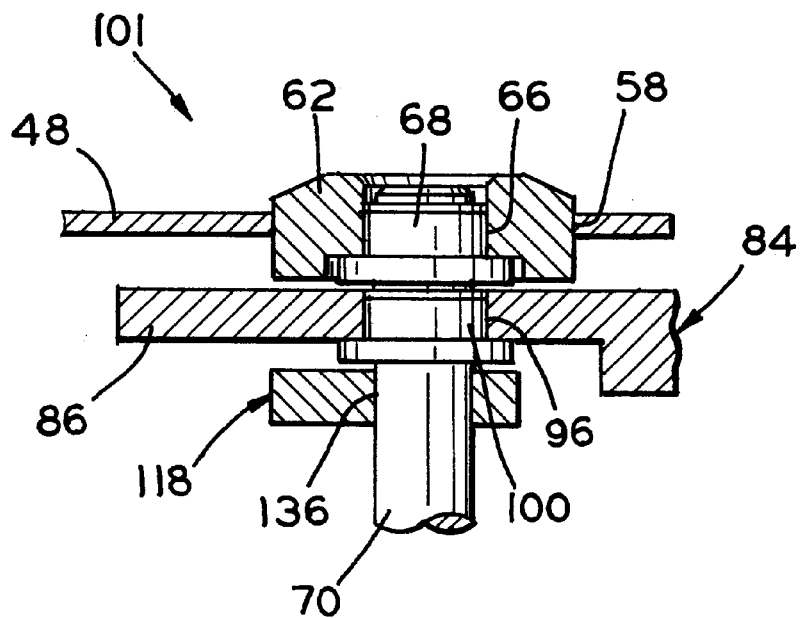
FIG. 4 is an enlarged sectional view of a portion of the joint illustrated in FIG. 3, further showing an anchor member of the storage device connected at the joint.

As illustrated in FIGS. 3 and 4, a pair of eyelets 62, 64 are disposed in the openings 58, 60 through the arms 48, 50. Preferably, the eyelets 62, 64 are formed from a metallic material such as steel. The eyelets 62, 64 are secured in the openings 58, 60 by any suitable method, such as welding. The eyelets 62, 64 are generally annular in shape. The outer diameter of each eyelet 62, 64 is approximately the same as the diameter of the corresponding 58, 60 opening in the arm 48, 50. However, the thickness of each eyelet 62, 64 is substantially greater than the thickness of the sheet metal of the arm 48, 50. A bore 66 is formed through the center of each eyelet 62, 64 (one bore 66 is shown).

A flanged sleeve bearing 68 is press fit inside the bore 66 of each eyelet 62, 64 (one bearing 68 is shown). The greater thickness of the eyelets 62, 64 provides additional surface area for holding the bearings 68. Preferably, the bearings 68 are formed from a metallic material such as bronze or bronze alloy.

During assembly, a rod 70 is mounted between the bearings 68 in the arms 48, 50 of the bracket 44. The rod 70 is adapted to rotate within the bearings 68. Preferably, the rod 70 is formed from a metallic material such as steel.

Referring again to FIGS. 1 and 2, the storage device 10 also includes an arm assembly 72 for lifting the object to be stored. The arm assembly 72 includes an elongated arm 74. Preferably, the arm 74 is a tube having a generally rectangular cross section. The arm 74 is preferably formed from a metallic material such as steel. The arm 74 includes an inner portion 76 having an inner end 78, and an outer portion 80 having an outer end 82. The inner portion 76 of the arm 74 is somewhat longer than the outer portion 80. The outer portion 80 of the arm 74 is angled slightly downwardly from the inner portion 76, preferably at an angle between about 20° and about 40°. The downward angle of the outer portion 80 facilitates grasping the outer end 82 of the arm 74 when the arm 74 is elevated.

As illustrated in FIGS. 2 and 3, the arm assembly 72 also includes a sleeve 84 attached to the inner end 78 of the arm 74. The sleeve 84 includes a pair of side portions 86, 88 attached to opposed sides of the arm 74, and a cross portion (not shown) extending between the side portions 86, 88 to connect them together. Preferably, the sleeve 84 is formed from a metallic material such as steel. The sleeve 84 is attached to the arm 74 by any suitable method, such as welding. The side portions 86, 88 of the sleeve 84 have upper portions 90 attached to the arm 74 and rounded lower portions 92 extending downward a short distance from the arm 74. A pair of openings 94 (one of which is shown) are formed through the lower portions 92 of the sleeve side portions 86, 88 to reduce the weight of the sleeve 84. A pair of aligned apertures 96, 98 are also formed through the lower portions 92 of the sleeve side portions 86, 88.

As illustrated in FIGS. 3 and 4, a flanged sleeve bearing 100 is press fit inside the aperture 96, 98 of each sleeve side portion 86, 88 (one bearing 100 is shown). Preferably, the bearings 100 are formed from a metallic material such as bronze or bronze alloy. The sleeve 84 of the arm assembly 72 is disposed between the arms 48, 50 of the stand 12. During assembly, the rod 70 is inserted through the bearings 100 to form a joint 101 between the arm assembly 72 and the stand 12. The rod 70 can rotate within the bearings 100, so that the arm assembly 72 can pivot up and down on the stand 12.

Figure 7:
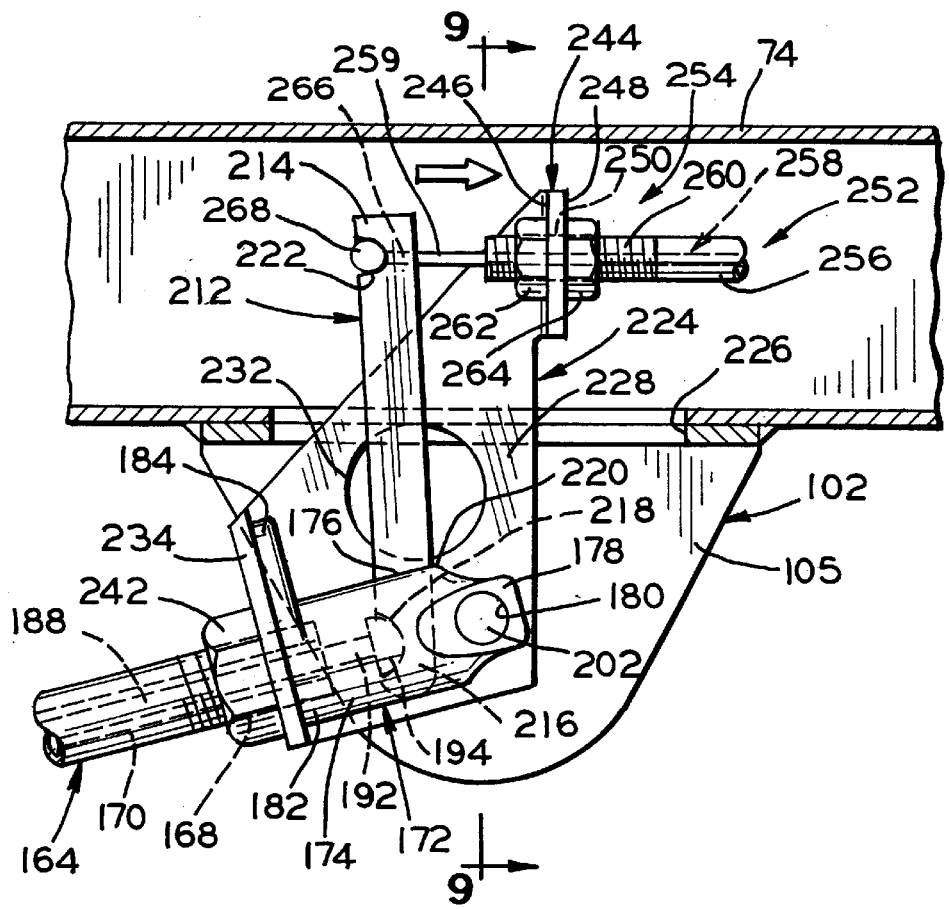
FIG. 7 is an enlarged side elevational view, partially in cross section, of a portion of the storage device illustrated in FIG. 1 in the area of a spring mount, showing a first portion of a trigger mechanism for activating a gas spring of the storage device.
Figure 9:
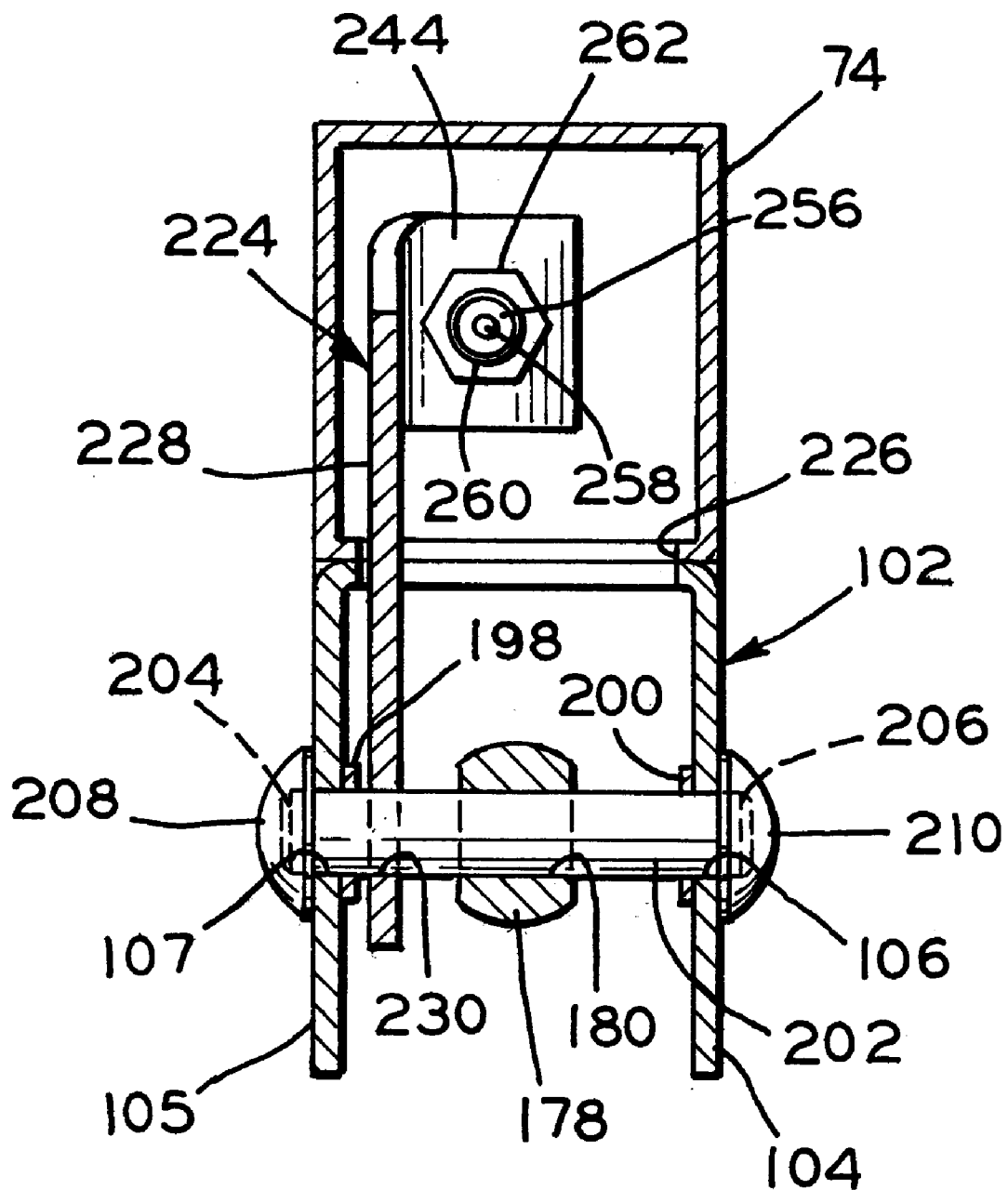
FIG. 9 is a sectional view of the trigger mechanism of the storage device taken along line 9—9 of FIG. 7.

As illustrated in FIGS. 2, 7 and 9, the arm assembly 72 also includes a spring mount 102. The spring mount 102 is attached to the lower surface of the inner portion 76 of the arm 74. The spring mount 102 includes a pair of spaced apart ears 104, 105. A pair of aligned apertures 106, 107 are formed through the ears 104, 105. The purpose of the spring mount 102 will be described below.

The arm assembly 72 further includes an attachment mount 108. The attachment mount 108 is attached to the lower surface of the outer end of the arm 74. The attachment mount 108 includes a pair of spaced apart ears 110 (one of which is shown). A pair of aligned apertures 112 (one of which is shown) are formed through the ears 110. The purpose of the attachment mount 108 will be described below.

Lastly, the arm assembly 72 includes a handle 114. The handle 114 is attached to the outer end of the arm 74. The handle 114 can be grasped by a person to lift the arm 74. The handle 114 can be any suitable structure, such as a curved metallic tube. A handle grip 116 formed from a plastic or rubber material can be provided to assist the person in grasping the handle 114.

Figure 5:
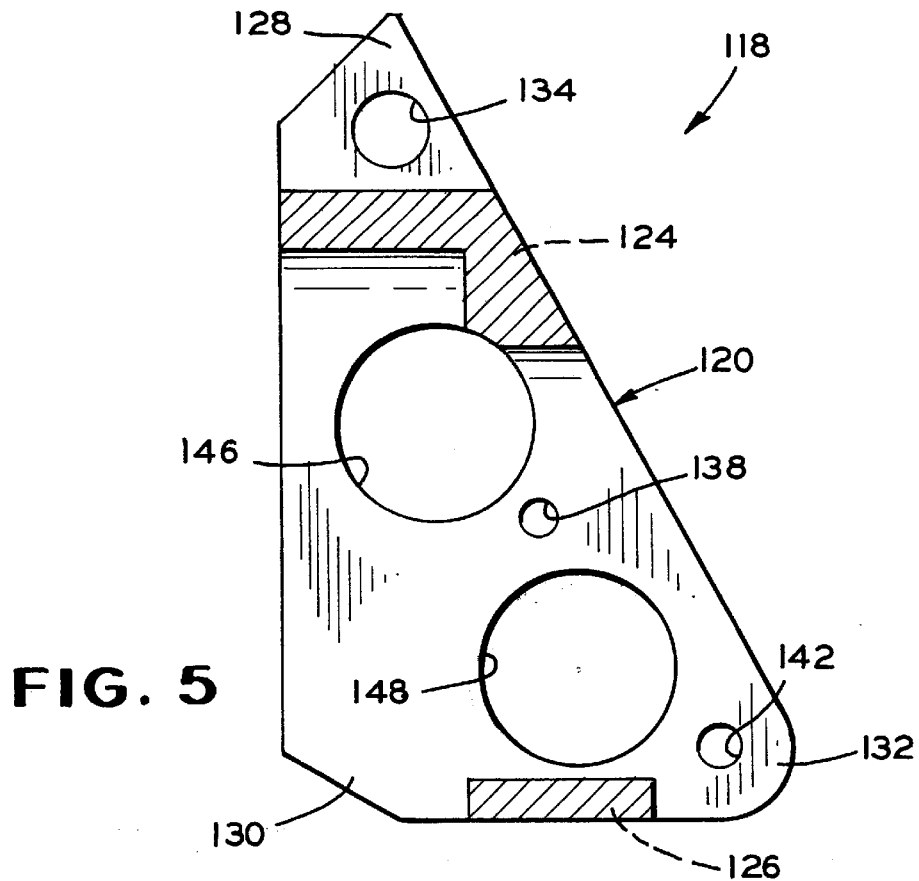
FIG. 5 is a side elevational view, partially in cross section, of the anchor member of the joint illustrated in FIGS. 3 and 4.
Figure 6:
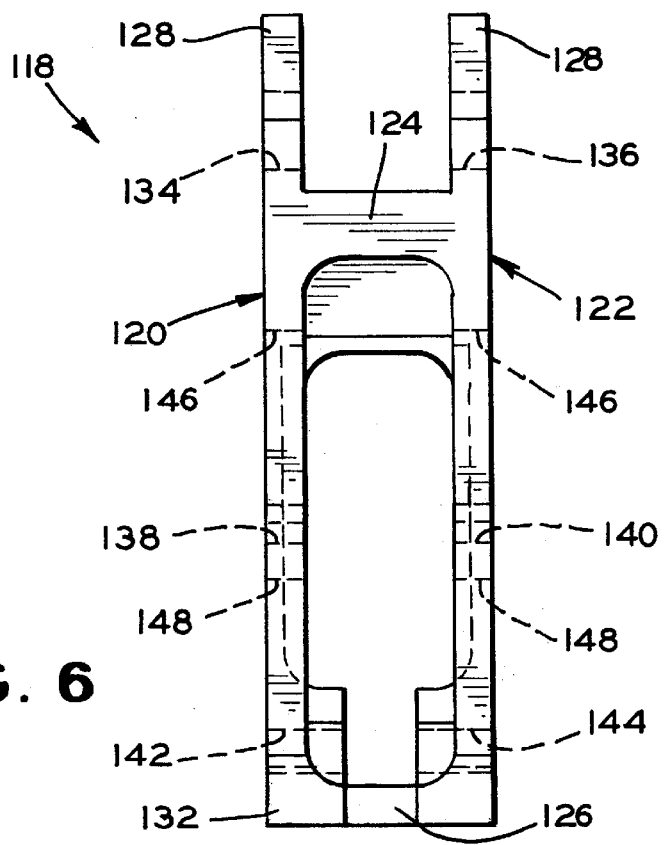
FIG. 6 is an end elevational view of the anchor member illustrated in FIG. 5.

Referring to FIGS. 2, 5 and 6, the storage device 10 also includes an anchor member 118. Preferably, the anchor member 118 is formed from a metallic material such as steel. The anchor member 118 is generally triangular in shape, including a pair of spaced apart side portions 120, 122, and upper and lower cross portions 124, 126 extending between the side portions 120, 122 to connect them together. The side portions 120, 122 are generally planar and triangular in shape, and extend generally parallel with one another. Each side portion 120, 122 includes a chamfered upper end 128, a chamfered lower end 130 and a rounded lower end 132.

A pair of aligned upper apertures 134, 136 are formed through the chamfered upper ends 128 of the side portions 120, 122 of the anchor member 118. During assembly, the side portions 120, 122 of the anchor member 118 are disposed between the side portions 86, 88 of the sleeve 84 of the arm assembly 72. As illustrated in FIG. 4, the rod 70 mounted between the arms 48, 50 of the stand 12 extends through the upper apertures 134, 136 of the anchor member 118 (one upper aperture 136 is shown) to form a joint 101 between the anchor member 118 and the stand 12. The rod 70 is press fit through the upper apertures 134, 136 of the anchor member 118. Because the rod 70 can rotate within both pairs of bearings 68 and 100, the anchor member 118 can pivot upward and downward relative to the stand 12.

A pair of aligned central apertures 138, 140 are also formed through the central area of the side portions 120, 122 of the anchor member 118. A pair of aligned lower apertures 142, 144 are also formed through the rounded lower ends 132 of the side portions 120, 122. The purpose of the central apertures 138, 140 and the lower apertures 142, 144 will be described below. Each side portion 120, 122 further includes a pair of openings 146, 148 formed therethrough to reduce the weight of the anchor member 118.

Referring again to FIGS. 1 and 2, the storage device 10 also includes a damper 150. A suitable damper 150 is a Bloc-O-Lift Damper manufactured by Stabilus, 92 County Line Road, Colmar, Pa. 18915. The damper 150 includes a cylinder 152 and a piston 154. The piston 154 is telescopically disposed within the cylinder 152. A force can be applied to the piston 154 to pull it out of the cylinder 152 to a fully extended position. Similarly, a force can be applied to the piston 154 to push it back into the cylinder 152 to a fully retracted position. The piston 154 resists movement because of friction between the piston 154 and the cylinder 152. Consequently, the piston 154 absorbs energy when a force is applied to push it or pull it within the cylinder 152. A predetermined minimum amount of force is required to cause any movement of the piston 154. The purpose of the damper 150 will be described below.

The damper 150 is mounted between the stand 12 and the anchor member 118. A first connecting pin 156 is attached to the inner end of the cylinder 152. The connecting pin 156 is mounted between the apertures 42 in the side surfaces 32, 34 of the stand 12, to connect the cylinder 152 to the stand 12. A second connecting pin 158 is attached to the outer end of the piston 154. The connecting pin 158 is mounted between the central apertures 138, 140 of the anchor member 118, to connect the piston 154 to the anchor member 118. When the anchor member 118 pivots upward relative to the stand 12, the anchor member 118 pulls the piston 154 out of the cylinder 152. When the anchor member 118 pivots downward relative to the stand 12, the anchor member 118 pushes the piston 154 back into the cylinder 152. In each direction, the damper 150 provides resistance to the movement of the anchor member 118.

As illustrated in FIGS. 1, 2, 7 and 8, the storage device 10 also includes a gas spring 160. The gas spring 160 includes a cylinder 162 containing pressurized gas. A piston 164 is telescopically disposed within the cylinder 162. The piston 164 includes an inner end 166 and an outer end 168. The outer end 168 of the piston 164 is threaded. An axial bore 170 is formed through the piston 164, for a purpose which will be described below.

When the gas spring 160 is activated, the pressurized gas inside the cylinder 162 urges the piston 164 to extend out of the cylinder 162. The activated piston 164 can apply force to another object as it extends from the cylinder 162. The piston 164 moves out of the cylinder 162 to a fully extended position. A force can be applied to the extended piston 164 to push it back into the cylinder 162 to a fully retracted position. The piston 164 absorbs energy from the applied force as it is pushed back into the cylinder 162. The purpose of the gas spring 160 will be described below.

Figure 8:
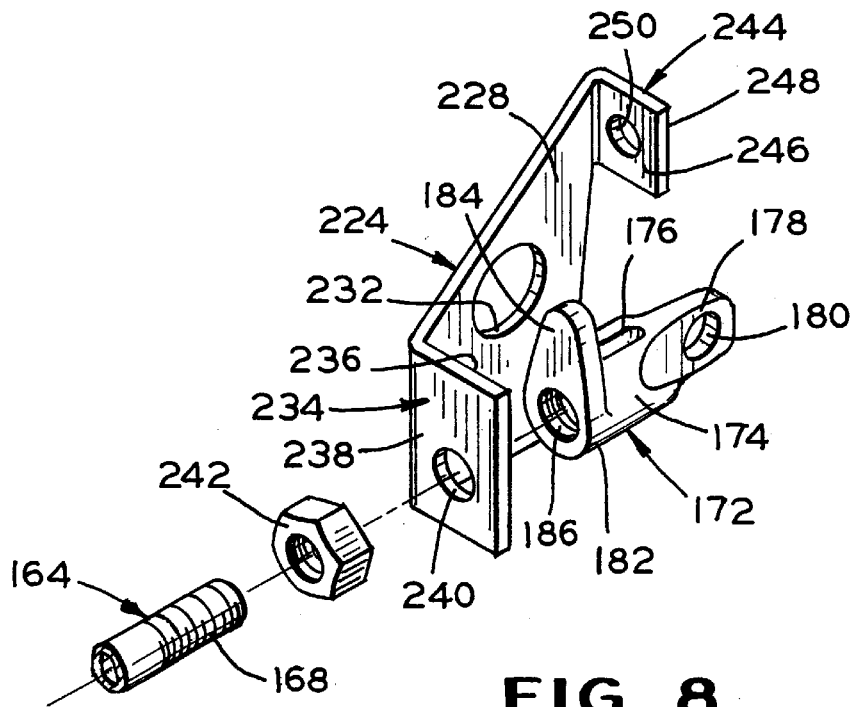
FIG. 8 is a perspective view illustrating the connection of a piston and a terminal to a terminal bracket in the trigger mechanism illustrated in FIG. 7.

As illustrated in FIGS. 7 and 8, the gas spring 160 also includes a terminal 172. Preferably, the terminal 172 is formed from a metallic material such as steel. The terminal 172 includes a hollow central portion 174. A slot 176 is formed through the upper surface of the central portion 174. The terminal 172 also includes an outer end 178 having flattened sides. An aperture 180 is formed through the outer end 178. The terminal 172 also includes an inner end 182 having an upwardly extending flange 184. A threaded aperture 186 is formed through the inner end 182. As will be described below, the inner end 182 of the terminal 172 is mounted on the outer end 168 of the piston 164.

As illustrated in FIGS. 2 and 7, the gas spring 160 further includes an activator pin 188. Preferably, the activator pin 188 is formed from a metallic material such as steel. The activator pin 188 is an elongated pin having a relatively small diameter. The activator pin 188 is slidably disposed inside the axial bore 170 of the piston. The activator pin 188 includes an inner end 190 disposed near the inner end 166 of the piston 164, inside the cylinder 162 of the gas spring 160. The activator pin 188 also includes an outer end 192 extending outward from the outer end 168 of the piston 164. The outer end 192 of the activator pin 188 extends inside the hollow central portion 174 of the terminal 172. The outer end 192 of the activator pin 188 includes an enlarged head 194.

The gas pressure inside the cylinder 162 forces the activator pin 188 to extend outward from the outer end 168 of the piston 164. However, when a force is applied to push the head 194 of the activator pin 188 inward toward the cylinder 162, the activator pin 188 slides inward within the axial bore 170 of the piston 164. The inner end 190 of the activator pin 188 moves inward into the active area of the cylinder 162. This activates the gas spring 160 to force the piston 164 out of the cylinder 162. When the inward force on the head 194 of the activator pin 188 is removed, the activator pin 188 slides outward within the axial bore 170 and the gas spring 160 is inactivated. Thus, the activator pin 188 functions as a locking device to control the activation of the gas spring 160. When the activator pin 188 is pushed into the active area of the cylinder 162, the gas spring 160 is activated or unlocked. When the activator pin 188 is not pushed into the active area of the cylinder 162, the gas spring 160 is inactivated or locked. A preferred lockable gas spring 160, including a terminal 172 and an activator pin 188, is a Bloc-O-Lift Gas spring 160 manufactured by Stabilus.

The gas spring 160 is mounted between the anchor member 118 and the spring mount 102 attached to the arm 74. A connecting pin 196 is attached to the inner end of the cylinder 162. The connecting pin 196 is mounted between the lower apertures 142, 144 of the anchor member 118, to connect the cylinder 162 to the anchor member 118. The anchor member 118 anchors the gas spring 160 and the damper 150 to the joint 101 between the stand 12 and the arm assembly 72. As illustrated in FIG. 9, a pair of snap-in bearings 198, 200 are mounted in the apertures 106, 107 in the ears 104, 105 of the spring mount 102. Preferably, the bearings 198, 200 are formed from a low friction plastic material such as nylon. During assembly, a rod 202 is mounted between the bearings 198, 200. The ends 204, 206 of the rod 202 extend past the ears 104, 105 of the spring mount 102 by a small distance. A pair of cap push nuts 208, 210 are attached to the ends 204, 206 of the rod 202 to connect the rod 202 to the spring mount 102. The terminal 172 on the outer end 168 of the piston 164 extends between the ears 104, 105 of the spring mount 102. The rod 202 extends through the aperture 180 in the outer end 178 of the terminal 172, to connect the terminal 172 to the spring mount 102. In this manner, the piston 164 is attached to the arm 74. Accordingly, when the gas spring 160 is activated, the piston 164 extends out of the cylinder 162 and pushes up on the arm 74.

As illustrated in FIG. 7, a lever 212 is mounted in the terminal 172 of the gas spring 160. The lever 212 is a relatively flat metallic piece. The lever 212 includes an upper end 214 and a lower end 216. The lower end 216 of the lever 212 extends through the slot 176 into the hollow central portion 174 of the terminal 172. A lower cutout 218 is formed in the lower end 216 of the lever 212. The head 194 of the activator pin 188 of the gas spring 160 is disposed in the lower cutout 218 of the lever 212. The lower end 216 of the lever 212 is trapped in position within the terminal 172 by the head 194 of the activator pin 188. The lever 212 includes a hinge point 220 which rests against the outer edge of the slot 176. The lever 212 is adapted to pivot around the hinge point 220. An upper cutout 222 is formed in the upper end 214 of the lever 212, for a purpose which will be described below.

As illustrated in FIGS. 7 through 9, a terminal bracket 224 is mounted between the ears 104, 105 of the spring mount 102. The terminal bracket 224 extends upward through an opening 226 into the hollow arm 74 of the storage device 10. Preferably, the terminal bracket 224 is formed from a sheet metal such as sheet steel. The sheet metal is cut into the desired shape and then bent into the desired configuration. The terminal bracket 224 includes a four-sided central plate 228 having an irregular shape. A lower aperture 230 is formed through the central plate 228. The rod 202 extends through the lower aperture 230 to connect the terminal bracket 224 to the spring mount 102 and the arm 74. The central plate 228 also includes a central opening 232 to reduce the weight of the terminal bracket 224.

The terminal bracket 224 also includes a lower flange 234 extending generally perpendicular to the central plate 228. The lower flange 234 has an inner side 236 and an outer side 238. An aperture 240 is formed through the lower flange 234. As best shown in FIG. 8, the flange 184 on the inner end 182 of the terminal 172 is disposed against the outer side 238 of the lower flange 234. The threaded aperture 186 of the terminal 172 is aligned with the aperture 240 through the lower flange 234. A nut 242 is threaded onto the threaded outer end 168 of the piston 164. The threaded outer end 168 of the piston 164 is inserted through the aperture 240 in the lower flange 234, and is threaded into the threaded aperture 186 of the terminal 172 to connect the piston 164 to the terminal 172. As illustrated in FIG. 7, the activator pin 188 extends from the axial bore 170 of the piston 164 through the aperture 240 in the lower flange 234, and into the hollow central portion 174 of the terminal 172.

The terminal bracket 224 also includes an upper flange 244 which is disposed inside the hollow arm 74. The upper flange 244 extends generally perpendicular to the central plate 228, in the same direction as the lower flange 234. The upper flange 244 has an inner side 246 and an outer side 248. The upper flange 244 has an aperture 250 formed therethrough, for a purpose which will be described below.

The storage device 10 also includes a cable assembly 252. The cable assembly 252 is disposed inside the hollow arm 74 of the storage device 10. As illustrated in FIGS. 7 and 9, the cable assembly 252 has an inner end 254 which is disposed above the spring mount 102 of the arm assembly 72. The cable assembly 252 includes a hollow outer sleeve 256, and a cable 258 which is slidably disposed within the sleeve 256. Preferably, the sleeve 256 is formed from a plastic material, and the cable 258 is formed from a metallic material such as steel. A threaded metallic sleeve 260 is provided on the inner end 254 of the cable assembly 252. The threaded sleeve 260 extends through the aperture 250 in the upper flange 244 of the terminal bracket 224. A pair of nuts 262, 264 are fastened to the threaded sleeve 260 on the inner side 246 and outer side 248 of the upper flange 244, to connect the inner end 254 of the cable assembly 252 to the terminal bracket 224. The threaded sleeve 260 and nuts 262, 264 allow adjustment of the length of the cable assembly 252. The inner end 259 of the cable 258 extends inward from the threaded sleeve 260, and through a vertical slot 266 formed in the upper end 214 of the lever 212. An inner ball 268 is attached to the inner end of the cable 258.

The inner ball 268 of the cable assembly 252 is disposed in the upper cutout 222 of the lever 212. When the cable 258 is pulled outward relative to the terminal bracket 224 (to the right as viewed in FIG. 7), the inner ball 268 is also pulled outward. The inner ball 268 pulls the upper end 214 of the lever 212 in the outward direction. Because the lever 212 pivots around its hinge point 220 on the terminal 172, the lower end 216 of the lever 212 moves in the inward direction (to the left as viewed in FIG. 7). The lower end 216 of the lever 212 pushes inward against the head 194 of the activator pin 188. The activator pin 188 is pushed inward within the piston 164, and the inner end 190 of the activator pin 188 extends into the active area of the cylinder 162. This activates the gas spring 160 to force the piston 164 out of the cylinder 162. Thus, pulling the cable 258 outward triggers the activation of the gas spring 160.

Figure 10:
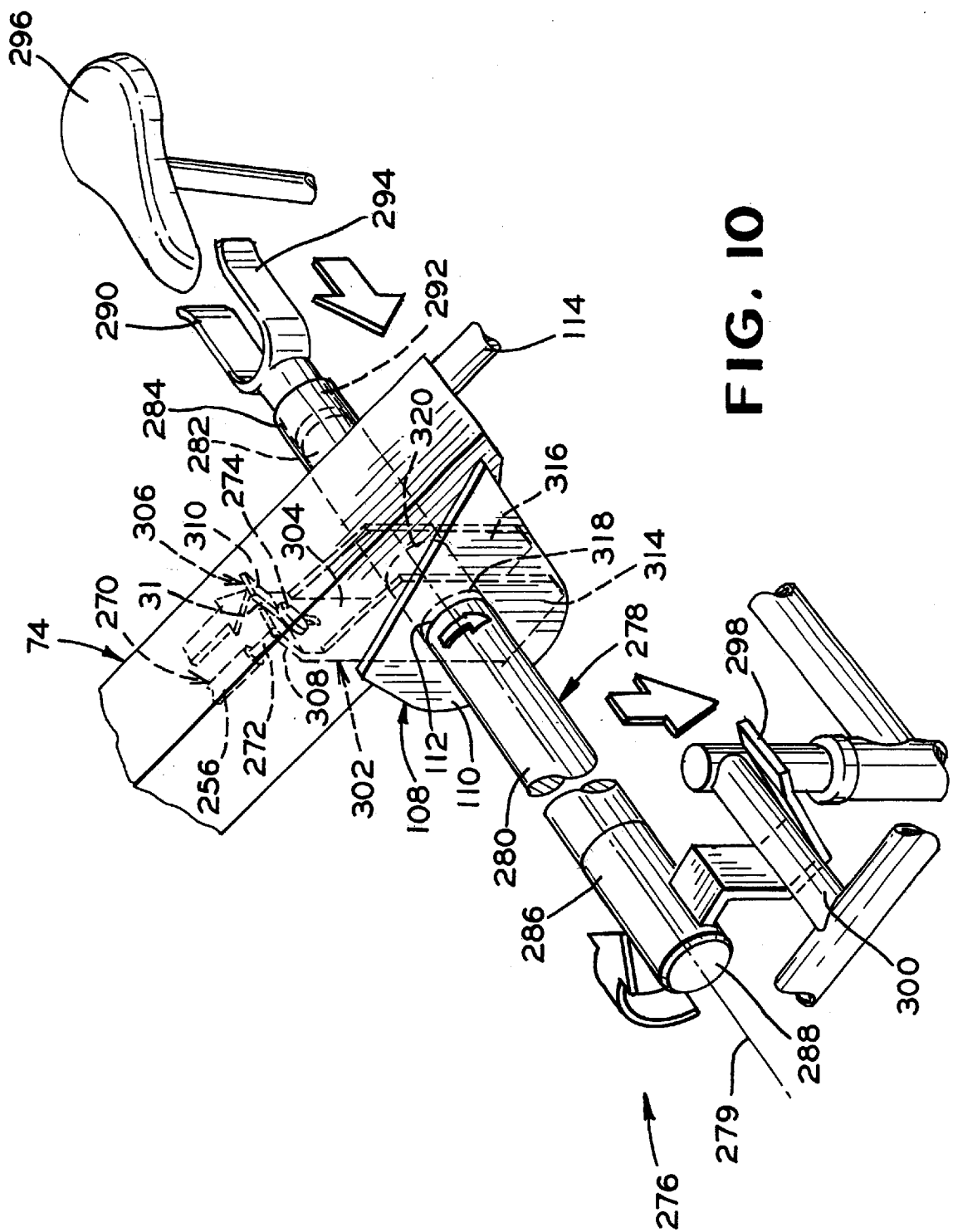
FIG. 10 is an enlarged perspective view of an outer portion of the storage device illustrated in FIG. 1, showing a second portion of a trigger mechanism for activating the gas spring.

As illustrated in FIG. 10, the cable assembly 252 also has an outer end 270 which is disposed above the attachment mount 108 of the arm assembly 72. The outer end 270 of the cable assembly 252 has a plastic fitting (not shown) molded onto the sleeve 256 of the cable assembly 252. The plastic fitting snaps into a hole in a flange (not shown) extending down from the upper surface of the arm 74. The outer end 272 of the cable 258 extends outward from the plastic fitting. An outer ball 274 is attached to the outer end 272 of the cable 258.

The storage device 10 also includes an attachment assembly 276. The attachment assembly 276 is mounted in the attachment mount 108 at the outer end 82 of the arm assembly 72. A pair of snap-in bearings (not shown) are mounted in the apertures 112 in the ears 110 of the attachment mount 108. Preferably, the bearings are formed from a low friction plastic material such as nylon. The attachment assembly 276 includes an elongated, generally cylindrical torsion tube 278. Preferably, the torsion tube 278 is formed from a lightweight material such as aluminum. The torsion tube 278 is mounted between the bearings in the apertures 112 of the attachment mount 108. The torsion tube 278 can rotate within the bearings about a rotational axis 279. The torsion tube 278 includes a first portion 280 having a first end 282. The first end 282 of the torsion tube 278 extends into a non-rotatable arm extension tube 284 which is secured to the arm 74. The torsion tube 278 also includes a second portion 286 having a second end 288. The second portion 286 is telescopically disposed within the first portion 280. The length of the torsion tube 278 is adjustable by sliding the first and second portions 280, 286 together or apart.

The attachment assembly 276 also includes a saddle hook 290. A first end 292 of the saddle hook 290 is disposed within the arm extension tube 284. The arm extension tube 284 functions to space the saddle hook 290 a desirable distance from the arm 74. A second end 294 of the saddle hook 290 is adapted for cradling the saddle 296 of a bicycle when the bicycle is mounted on the storage device 10. The attachment assembly 276 further includes a handlebar hook 298 connected to the second end 288 of the torsion tube 278. The handlebar hook 298 is adapted for cradling the handlebar 300 of the bicycle, to assure that the front wheel of the bicycle does not move.

The structure of the attachment assembly 276 controls the bicycle when it is lifted or lowered by the storage device 10, so that it does not move about and damage the bicycle or harm the person lifting the bicycle. The attachment assembly 276 is also constructed to assure correct positioning of the bicycle. Different structures of attachment assemblies can be employed depending on the object being lifted. For example, the storage device 10 can be equipped with a different attachment assembly for lifting a basket or a ladder, as will be described below.

An activator bracket 302 is mounted on the torsion tube 278. The activator bracket 302 is disposed between the ears 110 of the attachment mount 108 and extends upward through an opening (not shown) into the hollow arm 74. Preferably, the activator bracket 302 is formed from a sheet metal such as sheet steel. The sheet metal is cut into the desired shape and then bent into the desired configuration. The activator bracket 302 includes a generally rectangular central plate 304. The central plate 304 has an aperture (not shown) formed therethrough. A threaded fastener (not shown) extends through the aperture into a threaded aperture in the torsion tube 278, to secure the activator bracket 302 to the torsion tube 278. The central plate 304 includes an upper end 306 having an inner side 308 and an outer side 310. The upper end 306 of the central plate 304 is bent outwardly at a slight angle, preferably an angle between about 15° and about 25°. A vertical slot 312 is formed through the upper end 306 of the central plate 304. The outer end 272 of the cable 258 extends through the slot 312, and the outer ball 274 engages the outer side 310 of the central plate 304.

The activator bracket 302 also includes a pair of spaced apart side flanges 314, 316. The side flanges 314, 316 extend outward from the central plate 304 generally parallel with one another. A pair of aligned apertures 318, 320 are formed through the side flanges 314, 316. The torsion tube 278 is press fit through the apertures 318, 320 in the side flanges 314, 316.

As illustrated in FIG. 10, when the bicycle is mounted on the storage device 10, the weight of the bicycle pulls down on the handlebar hook 298. This causes the torsion tube 278 to rotate about its rotational axis 279. Because the activator bracket 302 is secured to the torsion tube 278, the activator bracket 302 also rotates about the rotational axis 279 of the torsion tube 278. The upper end 306 of the activator bracket 302 moves outwardly with respect to the aim 74. The upper end 306 of the activator bracket 302 pulls the outer ball 274 and the outer end 272 of the cable 258 in the outward direction (to the lower right as viewed in FIG. 10). As illustrated in FIG. 7, the inner end 259 of the cable 258 and the inner ball 268 are also pulled in the outward direction. As described above, the inner ball 268 pulls the lever 212, and the lever 212 pushes the activator pin 188, to activate or unlock the gas spring 160. Thus, mounting the bicycle on the storage device 10 triggers the activation of the gas spring 160.

Figure 12:
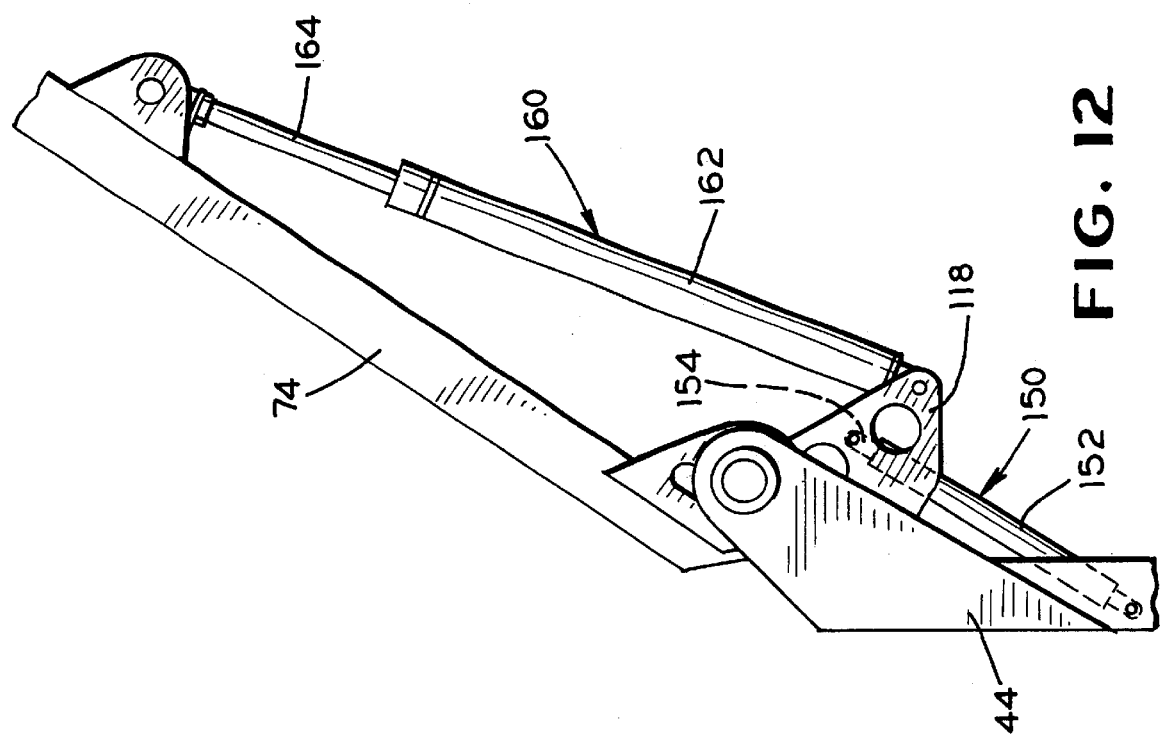
FIG. 12 is a side view of a portion of the storage device illustrated in FIG. 11, showing the gas spring in a partially extended position to assist in lifting the arm to the partially elevated position.
Figure 11:
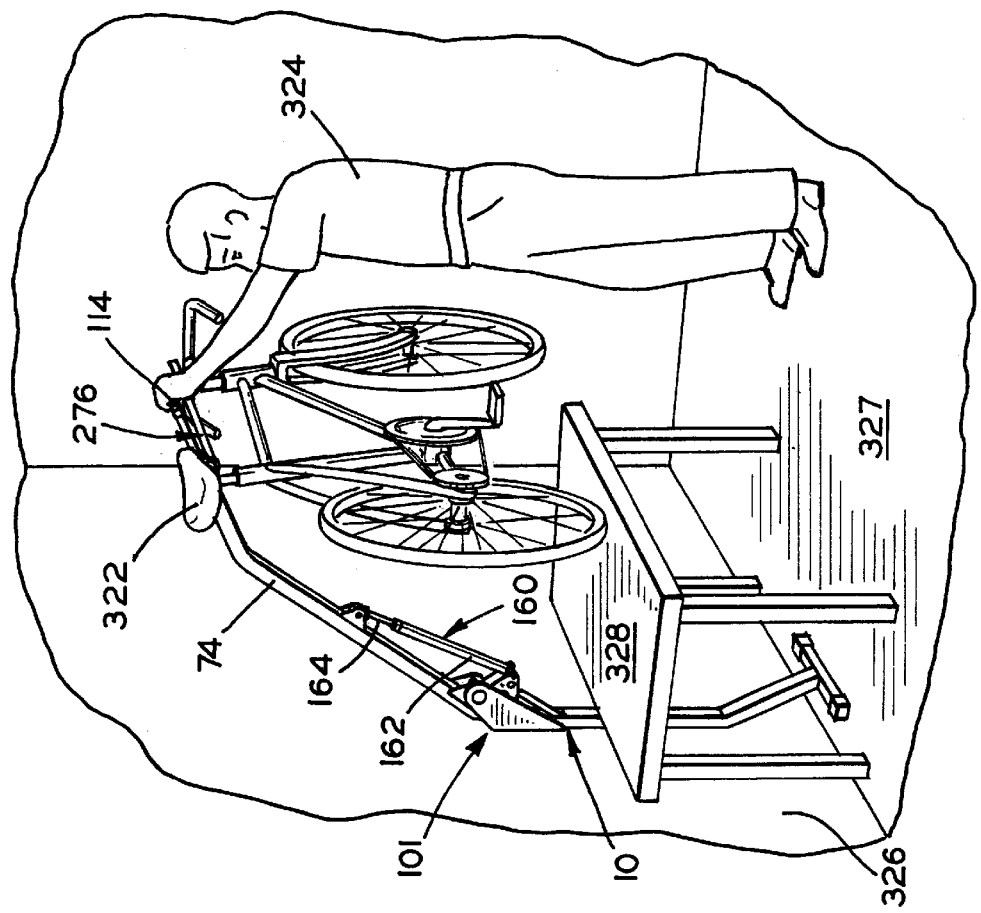
FIG. 11 is a perspective view illustrating a bicycle mounted on the storage device and a person lifting the arm to a partially elevated position.

FIG. 11 illustrates a bicycle 322 mounted on the storage device 10, and a person 324 lifting the arm 74 to a partially elevated position. In the illustrated embodiment, the storage device 10 is mounted on the wall 326 of a garage, to provide access to unused space on the upper portion of the wall. The storage device 10 can be mounted behind an object such as a workbench 328 to optimize the use of space in the garage. As described above, when the bicycle 322 is mounted on the storage device 10, the weight of the bicycle 322 activates or unlocks the gas spring 160. The activation of the gas spring 160 causes the piston 164 to extend out of the cylinder 162 and push up on the arm 74 of the storage device 10. FIG. 12 illustrates the gas spring 160 with the piston 164 partially extended from the cylinder 162, in contrast with FIG. 1 which illustrates the fully retracted position of the piston 164 before activation of the gas spring 160. The piston 164 pushing up on the arm 74 assists the person 324 in lifting the bicycle 322, so that only a reduced, comfortable amount of force is required to lift the bicycle 322. The person 324 continues to lift the arm 74 and the piston 164 of the gas spring 160 fully extends from the cylinder 162, to lift the bicycle 322 to the fully elevated storage position illustrated in FIG. 13. The structure of the storage device 10 guides the bicycle 322 effortlessly into the storage position in a controlled manner. The bicycle 322 is out of the way, and the workbench 328 remains usable.

Figure 13:
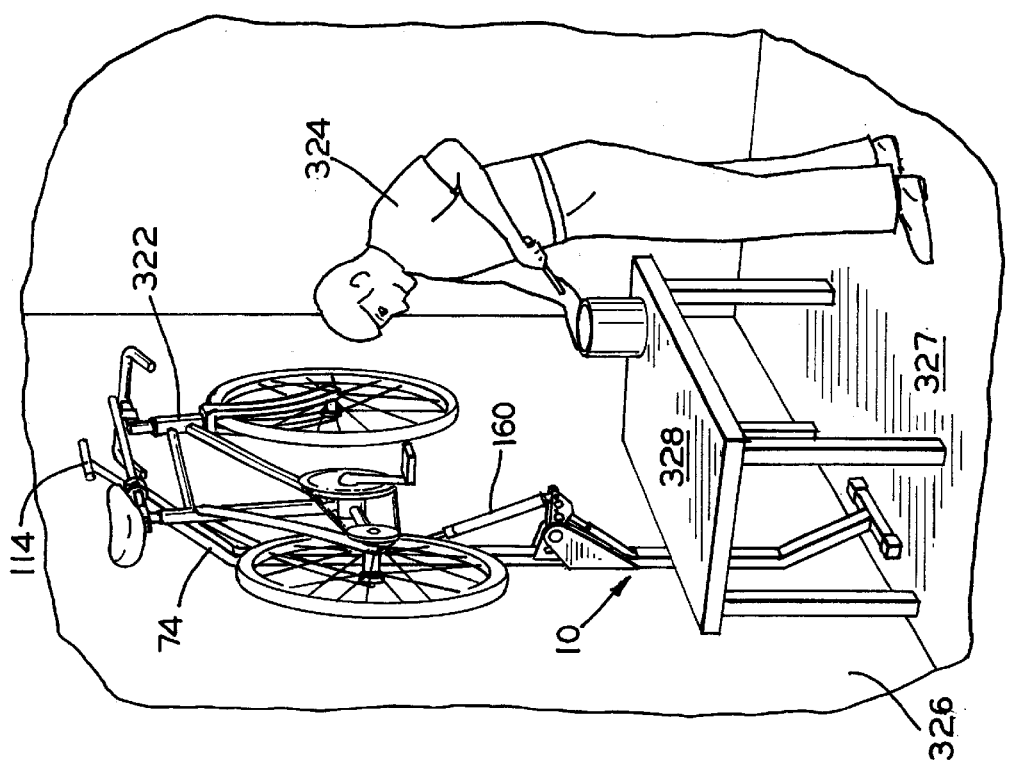
FIG. 13 is a perspective view similar to FIG. 11 showing the arm lifted to a fully elevated position to store the bicycle against an upper portion of the wall.

As illustrated in FIGS. 11 and 13, the arm 74 pivots in an arc which provides a clearance of the bicycle 322 over the workbench 328. The wheels of the bicycle 322 do not contact the edge of the workbench 328 when the bicycle 322 is lifted in an arc from the floor 327 over the workbench 328. If the bicycle 322 was lifted in a vertical motion instead of an arc, the space below the bicycle 322 would have to be clear. When the bicycle 322 is in the elevated storage position, a significant clearance is provided between the wheels of the bicycle 322 and the upper surface of the workbench 328 so that the bicycle 322 does not interfere with the use of the workbench 328. A typical workbench 328 is about 30 inches (76 centimeters) deep and about 32–36 inches (81–91 centimeters) high. In a preferred embodiment, a stored adult bicycle 322 is lifted to a height which provides a clearance over a second adult bicycle (not shown) positioned below the stored bicycle 322 adjacent to the wall 326. The distance of the joint 101 above the floor 327, and the length of the arm 74 between the joint and the attachment assembly 276, are selected so that the arm 74 pivots in an arc adapted to provide a desired clearance. The distance of the joint 101 above the floor 327 is usually from about 32 inches (81 centimeters) to about 52 inches (132 centimeters), and preferably from about 40 inches (102 centimeters) to about 46 inches (117 centimeters). The length of the arm 74 between the joint 101 and the attachment assembly 276 is from about 31 inches (79 centimeters) to about 51 is inches (130 centimeters), and preferably from about 39 inches (99 centimeters) to about 45 inches (114 centimeters).

The bicycle 322 can be lowered from the elevated storage position by pulling down on the handle 114 of the storage device 10. The gas spring 160 balances the weight of the bicycle 322 so that the bicycle 322 is lowered under a controlled descent instead of falling down too rapidly.

Figure 14:
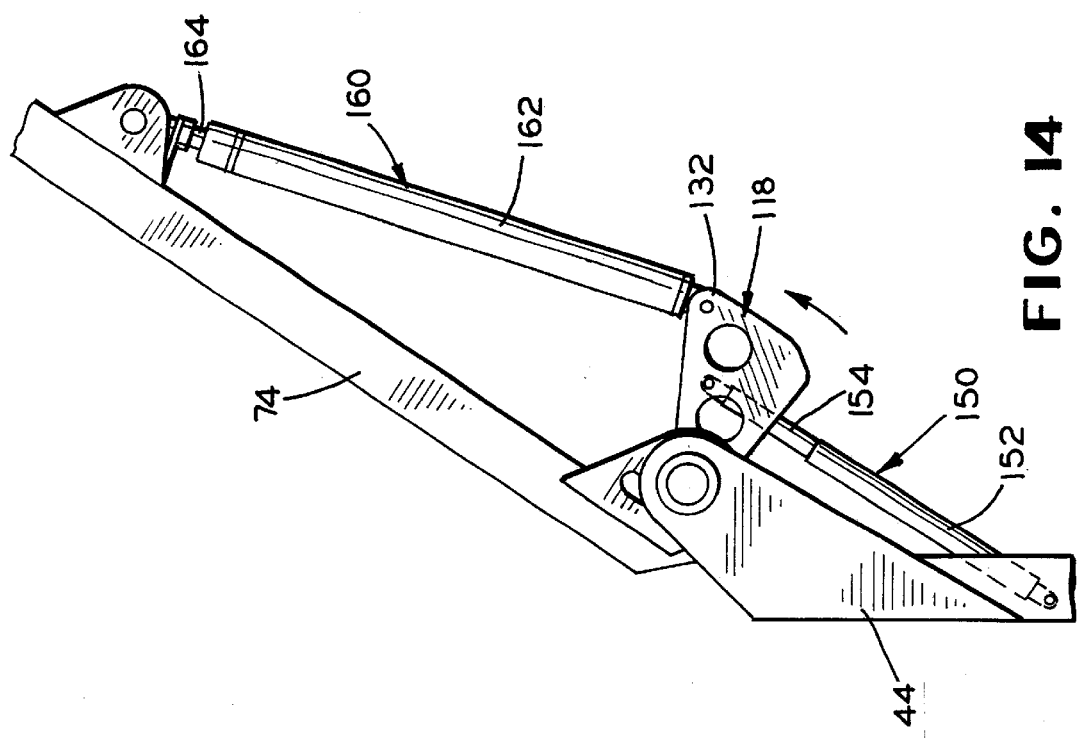
FIG. 14 is a side view of a portion of the storage device illustrated in FIG. 13, showing the arm lifted to a partially elevated position when no bicycle is mounted on the storage device.

After the bicycle 322 has been removed from the arm 74, the person 324 can lift the arm 74 to return it to the out-of-the-way storage position. Because the weight of the bicycle 322 has been removed from the arm 74, the gas spring 160 would push the arm 74 up too rapidly if the gas spring 160 was still activated. However, the structure of the storage device 10 prevents this from happening. As described above, when the weight of the bicycle 322 is removed from the storage device 10, the gas spring 160 is inactivated or locked. As illustrated in FIG. 14, the piston 164 of the locked gas spring 160 remains filly retracted within the cylinder 162. In a conventional device, the locked gas spring 160 would prevent the arm 74 from being lifted relative to the stand 12. However, the anchor member 118 and the damper 150 of the storage device 10 of the invention allow the arm 74 to be lifted while the gas spring 160 is locked. When the arm 74 is lifted, the locked gas spring 160 acts as a strut to pull up on the rounded lower end 132 of the anchor member 118. Because the anchor member 118 is pivotally mounted on the stand 12, the anchor member 118 is able to pivot upward as it is pulled by the gas spring 160. The pivoting anchor member 118 pulls upward on the piston 154 of the damper 150. As a result, the piston 154 of the damper 150 is pulled out of the cylinder 152 to the partially extended position illustrated in FIG. 14. When the arm 74 of the storage device 10 is lifted to a fully elevated storage position, the piston 154 of the damper 150 is fully extended (not shown) from the cylinder 152. Because the damper 150 requires a predetermined minimum amount of force to push the piston 154 back into the cylinder 152, the damper 150 holds the arm 74 in the elevated storage position. When the person is ready to lower the arm 74, the damper 150 balances the weight of the arm 74 so that the arm 74 is lowered under a controlled descent. Preferably, the damper 150 and arm 74 are balanced so that the arm 74 will lower slowly by itself once the arm 74 is pulled a predetennined distance from the wall 326.

Figure 15:
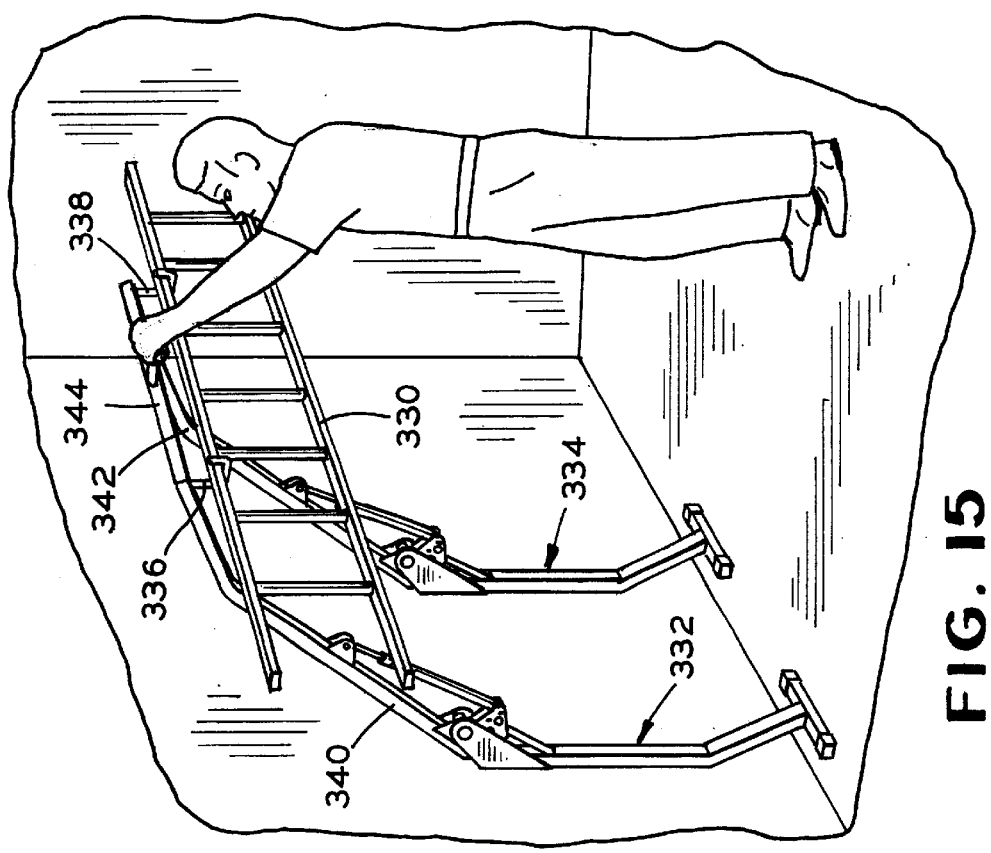
FIG. 15 is a perspective view illustrating a ladder being lifted between a pair of storage devices in accordance with the invention.

In one embodiment of the invention, multiple storage devices are linked together to lift an object. For example, to stabilize a relatively long object such as a ladder, the ladder can be mounted between a pair of storage devices. A cross member or other linking structure can be provided between the arms of the devices so that they lift the object in unison. FIG. 15 illustrates a ladder 330 being lifted between a pair of storage devices 332, 334. Hooks 336, 338 are attached to the ends of the arms 340, 342 for lifting the ladder 330. A cross member 344 is provided between the arms 340, 342.

Figure 16:
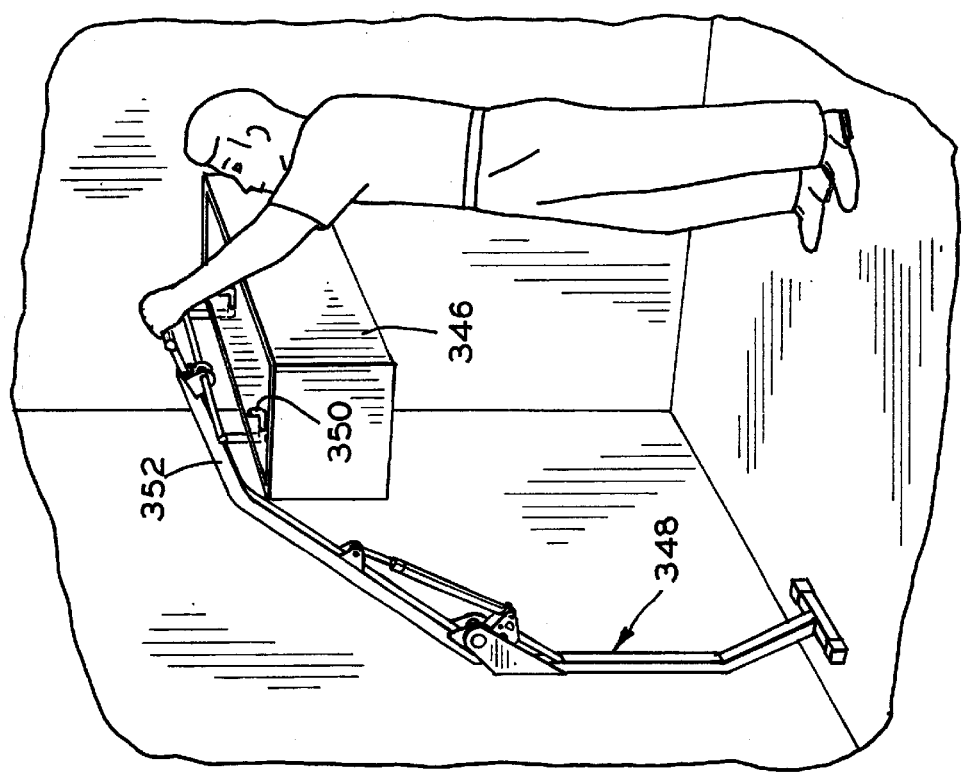
FIG. 16 is a perspective view illustrating a basket being lifted by a storage device in accordance with the invention.

FIG. 16 illustrates another embodiment in which a mesh basket 346 is being lifted by a storage device 348 in accordance with the invention. The basket 346 is mounted on a pair of hooks 350 (one of which is shown) on the end of the arm 352.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For instance, while the storage device has been illustrated as a device for lifting and storing a bicycle, ladder or basket, the device could be used for lifting and storing practically any object. Some examples include golf clubs, other sports equipment, tires, lawn mowers, snow blowers, lawn and garden implements, canoes and kayaks, trash cans, shelving, tools, clothing and other frequently found items. Moreover, the uses of the storage device are not limited to storage. For example, the device can serve as a bicycle stand or work center for repair, maintenance and cleaning. When used as a stand, the storage device is preferably equipped with a trigger mechanism adapted for locking and unlocking the gas spring anywhere within the path of travel of the arm. For example, the arm can be lifted to a partially elevated position and locked for use as a bicycle repair stand. While the illustrated storage device includes a gas spring 160 as the power source, other types of springs can be used, such as a compression spring or a constant force spring. The damper 150 can be any device which functions in the manner described above. The invention can utilize an external power source such as a motor instead of the gas spring 160. The motor would be mounted between the stand and the arm, and the device would not include the anchor member 118 or the damper 150. A preferred type of motor is a linear actuator. The storage device can be used not only in confined areas, such as a garage or patio, but also in any other area inside or outside a home, apartment or dormitory, and in other areas such as retail, industrial and medical. Many other uses of the storage device are also contemplated.

What is claimed is:

1. A device for supporting an object comprising:
a first device including a stand, an arm supported on said stand and movable between first and second arm positions, an anchor member supported on said stand and movable between first and second anchor member positions, a damper connected to said anchor member to resist movement of said anchor member between said first and second anchor member positions, and a spring device connected between said anchor member and said arm, said spring device operable in a first mode, wherein a force is generated by said spring device to urge said anchor member and said arm apart from one another, and in a second mode, wherein no force is generated by said spring device to urge said anchor member and said arm apart from one another;
a second device including a stand, an arm supported on said stand and movable between first and second arm positions, an anchor member supported on said stand and movable between first and second anchor member positions, a damper connected to said anchor member to resist movement of said anchor member between said first and second anchor member positions, and a spring device connected between said anchor member and said arm, said spring device operable in a first mode, wherein a force is generated by said spring device to urge said anchor member and said arm apart from one another, and in a second mode, wherein no force is generated by said spring device to urge said anchor member and said arm apart from one another;

a cross member connected between said arm of said first device and said arm of said second device, said cross member having an attachment for supporting the object thereon.

2. The device defined in claim 1 further including a trigger mechanism for selectively operating each of said spring device in said first and second modes.

3. The device defined in claim 2 wherein said attachment forms a portion of said trigger mechanisms.

4. The device defined in claim 3 wherein each of said trigger mechanisms includes a member adapted to rotate when the object is supported on said attachment and a cable extending between said member and said spring device.

5. The device defined in claim 4 wherein each of said arms is hollow and said cables extend respectively through said arms.

6. The device defined in claim 2 wherein each of said trigger mechanisms includes a lever adapted to push a pin to selectively operate each of said spring devices.

7. The device defined in claim 1 wherein said arms are pivotally supported respectively on said stands.

8. The device defined in claim 1 wherein said anchor members are pivotally supported respectively on said stands.

9. The device defined in claim 1 wherein said damper of said first device is connected between said stand and said anchor member of said first device, and wherein said damper of said second device is connected between said stand and said anchor member of said second device.

10. The device defined in claim 1 wherein each of said spring devices is one of a group of a gas spring, a compression spring, and a constant force spring.

11. The device defined in claim 1 wherein each of said spring devices is a selectively lockable spring, and wherein said first mode is an unlocked mode and wherein said second mode is a locked mode.

12. The device defined in claim 1 wherein said anchor members are pivotally connected respectively to both said stands and said arms.

13. The device defined in claim 1 wherein each of said anchor members includes a first portion connected to said stand and a second portion connected to said spring device.

14. The device defined in claim 1 wherein each of said spring devices is lockable at any position of said arm between said first and second arm positions.

15. A device for supporting an object comprising:

a first device including a stand, an arm supported on said stand and movable between first and second arm positions, an anchor member supported on said stand and movable between first and second anchor member positions, a damper connected to said anchor member to resist movement of said anchor member between said first and second anchor member positions, and a selectively extendable device connected between said anchor member and said arm, said selectively extendable device operable in a first mode, wherein said selectively extendable device is capable of being moved from a retracted position to an extended position to move said anchor member and said arm apart from one another, and in a second mode, wherein said selectively extendable device is not capable of being moved from said retracted position to said extended position to move said anchor member and said arm apart from one another;

a second device including a stand, an arm supported on said stand and movable between first and second arm positions, an anchor member supported on said stand and movable between first and second anchor member positions, a damper connected to said anchor member to resist movement of said anchor member between said first and second anchor member positions, and a selectively extendable device connected between said anchor member and said arm, said selectively extendable device operable in a first mode, wherein said selectively extendable device is capable of being moved from a retracted position to an extended position to move said anchor member and said arm apart from one another, and in a second mode, wherein said selectively extendable device is not capable of being moved from said retracted position to said extended position to move said anchor member and said arm apart from one another; and a cross member connected between said arm of said first device and said arm of said second device, said cross member having an attachment for supporting the object thereon.

16. The device defined in claim 15 wherein each of said selectively extendable devices is one of a group of a gas spring, a compression spring, and a constant force spring.

17. The device defined in claim 15 wherein each of said selectively extendable devices is a selectively lockable gas spring, and wherein said first mode is an unlocked mode and wherein said second mode is a locked mode.

* * * * *